(12) United States Patent
Wang et al.

(10) Patent No.: US 11,030,517 B2
(45) Date of Patent: Jun. 8, 2021

(54) SUMMARY OBTAINING METHOD, APPARATUS, AND DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventors: Xuxiang Wang, Shenzhen (CN); Dan Nie, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/600,990

(22) Filed: Oct. 14, 2019

(65) Prior Publication Data
US 2020/0042583 A1 Feb. 6, 2020

Related U.S. Application Data

(63) Continuation of application No. PCT/CN2018/112640, filed on Oct. 30, 2018.

(30) Foreign Application Priority Data

Nov. 14, 2017 (CN) .......................... 201711122315.3

(51) Int. Cl.
*G06N 3/04* (2006.01)
*G06F 40/253* (2020.01)
(Continued)

(52) U.S. Cl.
CPC ......... *G06N 3/0445* (2013.01); *G06F 40/166* (2020.01); *G06F 40/20* (2020.01);
(Continued)

(58) Field of Classification Search
None
See application file for complete search history.

(56) References Cited

U.S. PATENT DOCUMENTS 10,083,169 B1 * 9/2018 Ghosh ..................... G06F 40/35
10,445,356 B1 * 10/2019 Mugan .................. G06F 16/334
(Continued)

FOREIGN PATENT DOCUMENTS

| CN | 103617158 A | 3/2014 |
| CN | 106383817 A | 2/2017 |

(Continued)

OTHER PUBLICATIONS

Cheng, Jianpeng, and Mirella Lapata. "Neural summarization by extracting sentences and words." arXiv preprint arXiv:1603.07252 (2016). (Year: 2016).*

(Continued)

*Primary Examiner* — Frank D Mills
(74) *Attorney, Agent, or Firm* — Anova Law Group, PLLC (57) ABSTRACT

A summary obtaining method includes obtaining a target document from which a summary is to be obtained; dividing the target document into sentences and dividing each sentence into words; and obtaining a classifier constructed based on a long short-term memory (LSTM) model. The classifier comprises a word-level LSTM layer configured to determine a vector of each sentence according to the words in each sentence, and a sentence-level LSTM layer configured to determine a vector of the target document according to the vector of each sentence. The method further includes determining, by using the classifier, a probability that each sentence is a summary sentence, according to the vector of the target document and a vector of the sentence; and determining a sentence with the probability satisfying a predetermined condition for a summary sentence, as a (Continued)

summary sentence of the target document, and forming the summary according to the summary sentence.

20 Claims, 5 Drawing Sheets

(51) Int. Cl.
  *G06F 40/166* (2020.01)
  *G06F 40/205* (2020.01)
  *G06F 40/30* (2020.01)
  *G06N 3/08* (2006.01)
  *G06F 40/20* (2020.01)

(52) U.S. Cl.
  CPC .......... *G06F 40/205* (2020.01); *G06F 40/253* (2020.01); *G06F 40/30* (2020.01); *G06N 3/08* (2013.01)

(56) References Cited

U.S. PATENT DOCUMENTS

| | | | | |
|---|---|---|---|---|
| 2015/0339288 A1* | 11/2015 | Baker | .................. | G06F 40/166 704/9 |
| 2019/0034416 A1* | 1/2019 | Al Hasan | ............. | G06N 3/0454 |

FOREIGN PATENT DOCUMENTS

| | | |
|---|---|---|
| CN | 106407178 A | 2/2017 |
| CN | 107291836 A | 10/2017 |
| WO | 2016003777 A1 | 1/2016 |

OTHER PUBLICATIONS

Ren, et al. "Leveraging contextual sentence relations for extractive summarization using a neural attention model." In Proceedings of the 40th International ACM SIGIR Conference on Research and Development in Information Retrieval, pp. 95-104 (Year: 2017).*

Zhang, Chi, Shagan Sah, Thang Nguyen, Dheeraj Peri, Alexander Loui, Carl Salvaggio, and Raymond Ptucha. "Semantic sentence embeddings for paraphrasing and text summarization." In 2017 IEEE Global Conference on Signal and Information Processing (GlobalSIP), pp. 705-709. IEEE, 2017. (Year: 2017).*

Nallapati, Ramesh, Bowen Zhou, Caglar Gulcehre, and Bing Xiang. "Abstractive text summarization using sequence-to-sequence rnns and beyond." arXiv preprint arXiv:1602.06023 (2016). (Year: 2016).*

Wang, Y., and J. Zhang. "Keyword extraction from online product reviews based on bi-directional LSTM recurrent neural network." In 2017 IEEE International Conference on Industrial Engineering and Engineering Management (IEEM), pp. 2241-2245. IEEE, 2017. (Year: 2017).*

The World Intellectual Property Organization (WIPO) International Search Report for PCT/CN2018/112640 dated Jan. 30, 2019 6 Pages (including translation).

* cited by examiner

SUMMARY OBTAINING METHOD, APPARATUS, AND DEVICE, AND COMPUTER-READABLE STORAGE MEDIUM

RELATED APPLICATIONS

This application is a continuation application of PCT Patent Application No. PCT/CN2018/112640, filed on Oct. 30, 2018, which claims priority to Chinese Patent Application No. 201711122315.3, filed with the Chinese Patent Office on Nov. 14, 2017, and entitled "SUMMARY OBTAINING METHOD, APPARATUS, AND DEVICE, AND COMPUTER-READABLE STORAGE MEDIUM", content of all of which is incorporated herein by reference in its entirety.

FIELD OF THE TECHNOLOGY

The present disclosure relates to the field of Internet technologies and, specifically, to a method and system for automatically obtaining an abstract of an article.

BACKGROUND OF THE DISCLOSURE

With the rapid development of the information age, a large amount of text information has been accumulated in the Internet. However, points of interest of people usually include only a very small part of the information. How to find these points of interest quickly and effectively from massive information is an urgent problem to be resolved. Information searching technology alleviates some pressure caused by this problem. However, thousands of searching results are still far from meeting actual needs of people. Such information searching technology cannot achieve good results when information is overloaded, while an automatic summarization technology can play an auxiliary role to some extent.

Firstly, in a process of information searching, a high-quality abstract or summary can be used for replacing an original text for searching, to greatly improve efficiency of the searching. Secondly, in visualization of searching results, users can easily select information by using a high-quality abstract or summary without browsing a large number of original searching results, to improve a hit rate of requested information, and greatly reduce burden on the users. Therefore, the automatic summarization technology has gradually become one of research hotspots in the current information searching field.

The purpose of the automatic summarization technology is to compress information in an original text while retaining core content of the original text. An abstract or summary accurately and comprehensively reflects core content of an article, and the automatic summarization technology is used for automatically extracting an abstract or summary from a document. However, currently, an urgent problem needs to be solved is that a summary extracted by the current automatic summarization technology often is not accurate.

SUMMARY

Embodiments of the present disclosure provide an improved summary obtaining method to improve accuracy of the obtained summary.

According to a first aspect, an embodiment of the present disclosure provides a summary obtaining method applied to a computer device. The method includes obtaining a target document from which a summary is to be obtained; dividing the target document into sentences and dividing each sentence into words; and obtaining a classifier constructed based on a long short-term memory (LSTM) model. The classifier comprises a word-level LSTM layer and a sentence-level LSTM layer, the word-level LSTM layer is configured to determine a vector of each sentence according to the words in each sentence, the sentence-level LSTM layer is configured to determine a vector of the target document according to the vector of each sentence. The method also includes determining, by using the classifier, a probability that each sentence is a summary sentence, according to the vector of the target document and a vector of the sentence; and determining, in the sentences, a sentence with the probability satisfying a predetermined condition for a summary sentence, as a summary sentence of the target document, and forming the summary of the target document according to the summary sentence of the target document.

According to a second aspect, an embodiment of the present disclosure provides a computer device for obtaining summaries of documents. The computer device includes an input/output (I/O) interface; a memory storing computer program instructions; and a processor coupled to I/O interface and to the memory. When executing the computer program instructions, the processor is configured to perform: obtaining a target document from which a summary is to be obtained via the I/O interface; dividing the target document into sentences and dividing each sentence into words; obtaining a classifier constructed based on a long short-term memory (LSTM) model, wherein the classifier comprises a word-level LSTM layer and a sentence-level LSTM layer, the word-level LSTM layer is configured to determine a vector of each sentence according to the words in each sentence, the sentence-level LSTM layer is configured to determine a vector of the target document according to the vector of each sentence; determining, by using the classifier, a probability that each sentence is a summary sentence, according to the vector of the target document and a vector of the sentence; and determining, in the sentences, a sentence with the probability satisfying a predetermined condition for a summary sentence, as a summary sentence of the target document, and forming the summary of the target document according to the summary sentence of the target document.

According to a third aspect, an embodiment of the present disclosure provides a non-transitory computer-readable storage medium. The non-transitory computer-readable storage medium stores computer program instructions executable by at least one processor to perform: obtaining a target document from which a summary is to be obtained via the I/O interface; dividing the target document into sentences and dividing each sentence into words; obtaining a classifier constructed based on a long short-term memory (LSTM) model, wherein the classifier comprises a word-level LSTM layer and a sentence-level LSTM layer, the word-level LSTM layer is configured to determine a vector of each sentence according to the words in each sentence, the sentence-level LSTM layer is configured to determine a vector of the target document according to the vector of each sentence; determining, by using the classifier, a probability that each sentence is a summary sentence, according to the vector of the target document and a vector of the sentence; and determining, in the sentences, a sentence with the probability satisfying a predetermined condition for a summary sentence, as a summary sentence of the target document, and forming the summary of the target document according to the summary sentence of the target document.

Other aspects of the present disclosure can be understood by those skilled in the art in light of the description, the claims, and the drawings of the present disclosure.

DETAILED DESCRIPTION

The embodiments of the present disclosure are described below with reference to the accompanying drawings. Apparently, the described embodiments are some rather than all of the embodiments of the present disclosure. A person skilled in the art can understand that, with the development of technology and the emergence of new application scenarios, the technical solutions provided in the embodiments of the present disclosure may be applied to similar technical problems.

The embodiments of the present disclosure provide a summary obtaining method, to improve the accuracy of an obtained summary from an article or any document. The embodiments of the present disclosure further provide a training method for a classifier for summary extraction, and a corresponding apparatus, device, and computer-readable storage medium. Details are separately described below.

The embodiments of the present disclosure may be applied to a computer device, and the computer device has functions of data processing and model training. The computer device may be specifically a personal computer, a mobile phone, a server, or the like.

The classifier for summary extraction provided in the embodiments of the present disclosure is generated based on training of an LSTM (Long Short-Term Memory) model, and the LSTM model in the embodiments of the present disclosure includes a word-level LSTM layer and a sentence-level LSTM layer. A document includes a plurality of sentences, a sentence includes a plurality of words, and a title of the document is a sentence. Therefore, in a process of extracting a summary of the document, words in the sentence need to be first analyzed, and then sentences in the document are analyzed. Then a probability that each sentence is a summary sentence is predicted. In a training process of the classifier for summary extraction, a plurality of documents is used for training the LSTM model, so that parameters in the LSTM model are determined, and the classifier is trained. A word vector is an input of the word-level LSTM layer, and the word vector may be obtained through pre-training of a large-scale corpus, or may be obtained according to a task corpus during model training.

Figure 1:
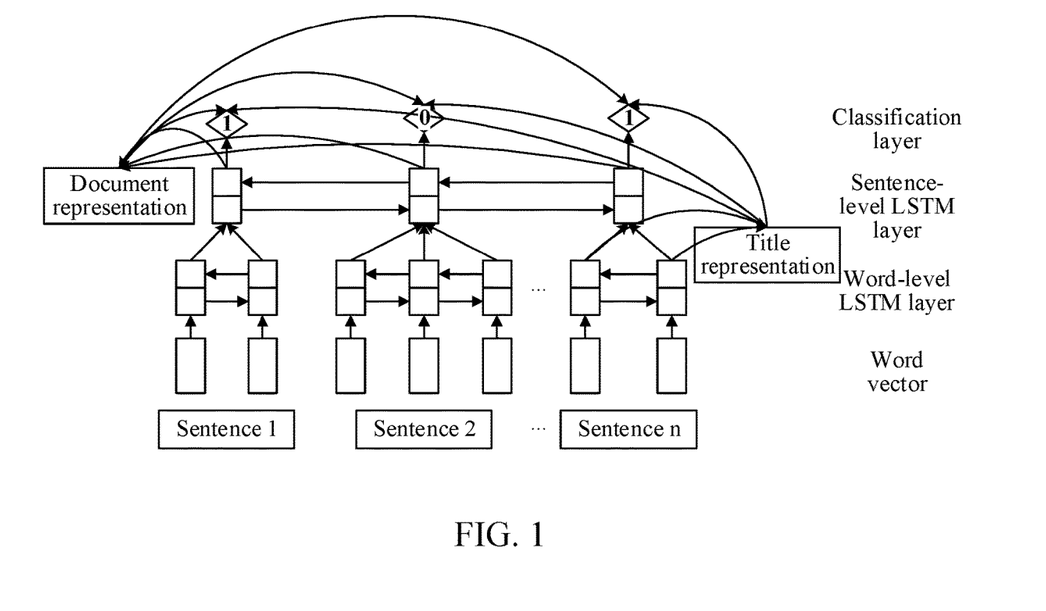
FIG. 1 is a schematic structural diagram of an LSTM (Long Short-Term Memory) model according to an embodiment of the present disclosure.
Figure 2:
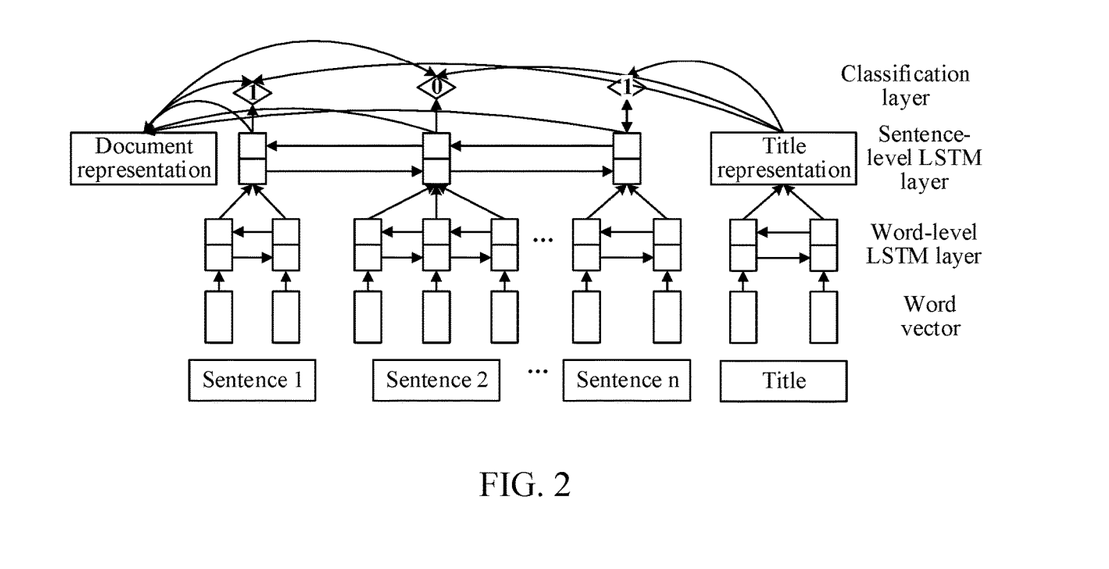
FIG. 2 is another schematic structural diagram of an LSTM model according to an embodiment of the present disclosure.
Figure 3:
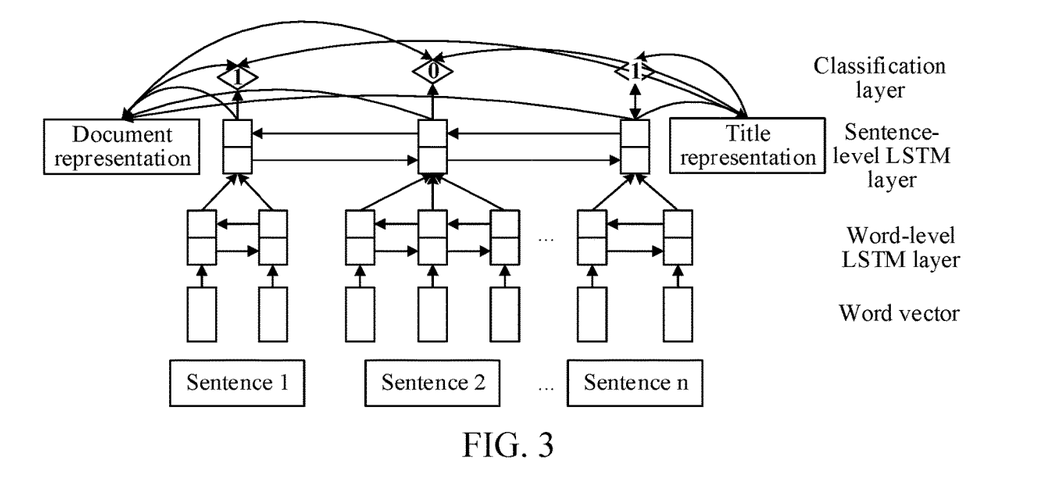
FIG. 3 is another schematic structural diagram of an LSTM model according to an embodiment of the present disclosure.

To facilitate understanding of the schematic structural diagrams of the LSTM model, refer to FIG. 1 to FIG. 3. FIG. 1 is a schematic structural diagram of an LSTM model according to an embodiment of the present disclosure.

As shown in FIG. 1, the LSTM model includes a word-level LSTM layer and a sentence-level LSTM layer, and both the word-level LSTM layer and the sentence-level LSTM layer are bidirectional LSTM. The bidirectional LSTM means that both the word-level LSTM layer and the sentence-level LSTM layer include sequential LSTM and inverse LSTM. Using the word-level LSTM layer as an example, for words included in each sentence, the sequential LSTM refers to an order from the first word to the last word, while the reverse LSTM refers to an order from the last word to the first word. Similarly, for the sentence-level LSTM layer, the sequential LSTM refers to an order from the first sentence to the last sentence, while the reverse LSTM refers to an order from the last sentence to the first sentence.

In FIG. 1 to FIG. 3, the processes for processing the sentences in the document and the words in the sentences are the same, and there are slight differences in processing of the title of the document.

In FIG. 1, a title is calculated by reusing bidirectional LSTM of sentences in a document, that is, reusing parameters of sentence-level LSTM in the document.

In FIG. 2, a title is calculated by using separate bidirectional LSTM, that is, separately training additional LSTM to represent a title vector without reusing parameters of sentence-level LSTM in a document.

In FIG. 3, a title vector representation may further be generated by sentence-level LSTM, that is, calculated by reusing parameters of word-level LSTM and sentence-level LSTM through two layers of bidirectional LSTM, and the process is the same as that of sentences in a document.

Figure 4:
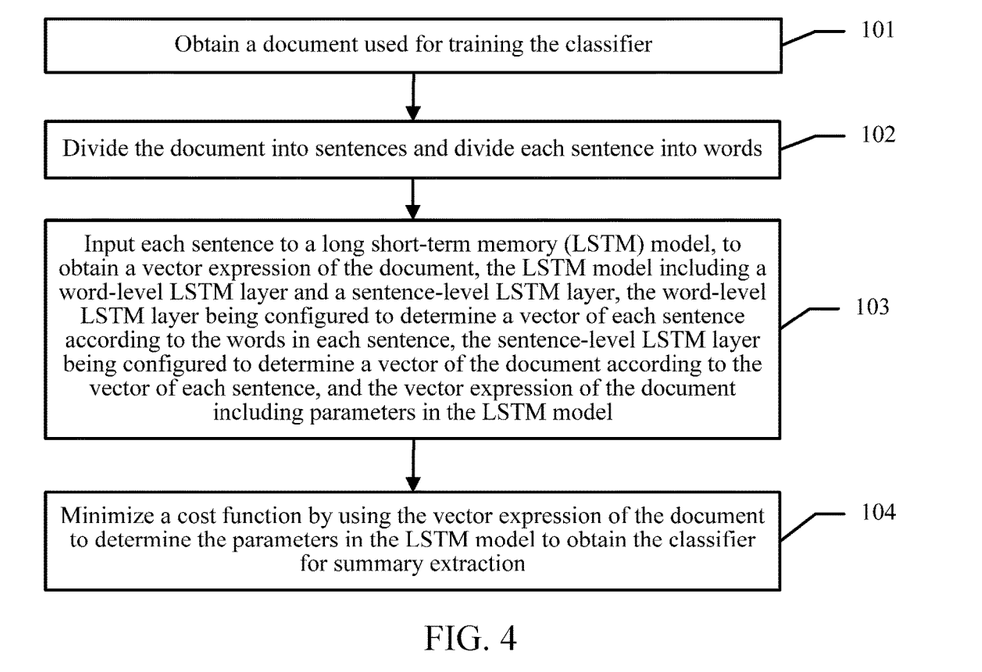
FIG. 4 is a schematic diagram of a training method for a classifier for summary extraction according to embodiments of the present disclosure.

To understand the processes for processing the words in the sentences and the sentences in the document in a training phase of the classifier for summary extraction, refer to FIG. 4.

As shown in FIG. 4, in the embodiments of the present disclosure, a training method for a classifier for summary extraction is provided, and the method includes the followings.

101. Obtain a document used for training the classifier.

The document used for training the classifier may be a sample document whose summary is determined in advance, or may be a document whose summary is not determined in to advance but is automatically learned through deep learning.

102. Divide the document into sentences and divide each sentence into words.

For example, a dividing process may include: dividing the document into sentences according to boundary separators between sentences in the document; dividing each sentence into word sets; and removing words that do not participate in semantic analysis in the word sets, to obtain each sentence used for training the classifier and obtain each word that participates in semantic analysis in each sentence.

That is, the process of pre-dividing the document is to process an original document into a structured representation. The process generally includes: identifying sentence boundaries, dividing sentences into words, removing stop words, and the like.

The identifying sentence boundaries may include: punctuation marks are often used in the document to identify sentence boundaries, such as periods, exclamation marks, and question marks, and some rules are made for identifying the sentence boundaries in consideration of context information before and after punctuations.

The dividing sentences into words may include: there are boundaries between words in English, but not in Chinese, so that sentences of the original document need to be divided into words to help a computer better understand Chinese sentences.

The removing stop words means that: words that do not participate in semantic analysis in understanding a sentence, such as Chinese "的" and "了", are removed.

103. Input each sentence to an LSTM model, to obtain a vector expression of the document, the LSTM model including a word-level LSTM layer and a sentence-level LSTM layer, the word-level LSTM layer being configured to determine a vector of each sentence according to the words in each sentence, the sentence-level LSTM layer being configured to determine a vector of the document according to the vector of each sentence, and the vector expression of the document including parameters in the LSTM model.

The vector of the document may be a mean vector of the vectors of the sentences, or may be calculated by methods such as weighting according to the vector of each sentence.

To understand the structure of the LSTM model, refer to FIG. 1 to FIG. 3. LSTM is used for constructing a sentence classifier. In LSTM cells, a special memory cell is designed to store historical information. The update and use of historical information are respectively controlled by three gates: an input gate, a forget gate, and an output gate. The input gate $i_t$, the forget gate $f_t$, the output gate $o_t$, an LSTM memory cell $c_t$ and a candidate memory cell $\tilde{c}_t$ at a moment t, and an output $h_t$ of the LSTM cell are shown in a formula (1) to a formula (6):

$$\tilde{c}_t = \tanh(W_{xc}x_t + W_{hc}h_{t-1}) \quad (1)$$

$$i_t = \sigma(W_{xi}x_t + W_{hi}h_{t-1} + W_{ci}c_{t-1}) \quad (2)$$

$$f_t = \sigma(W_{xf}x_t + W_{hf}h_{t-1} + W_{cf}c_{t-1}) \quad (3)$$

$$c_t = f_t \odot c_{t-1} + i_t \odot \tilde{c}_t \quad (4)$$

$$o_t = \sigma(W_{xo}x_t + W_{ho}h_{t-1} + W_{cf}c_{t-1}) \quad (5)$$

$$h_t = o_t \odot \tanh(c_t) \quad (6)$$

$W_{xc}$, $W_{hc}$, $W_{xi}$, $W_{hi}$, $W_{ci}$, $W_{xf}$, $W_{hf}$, $W_{cf}$, $W_{xo}$, $W_{ho}$, and $W_{cf}$ are parameters of the LSTM cell, $h_t$ represents the output of the LSTM cell at the moment t, $x_t$ represents an input of the LSTM cell at the moment t, $h_{t-1}$ represents an output of the LSTM cell at a moment t−1, and $\odot$ represents a pointwise product.

Further, $x_t$ that is inputted to the word-level LSTM layer represents a word vector of a word in a sentence that is inputted at the moment t, and $h_t$ represents a vector of a sentence that is outputted at the moment t.

Further, $x_t$ that is inputted to the sentence-level LSTM layer represents a word vector of a sentence that is inputted at the moment t, and $h_t$ represents a vector of a document that is outputted at the moment t.

In FIG. 1 to FIG. 3, the word-level LSTM layer is aimed at each sentence, for example, in a sentence 1, hidden layer state representations of words are sequentially calculated based on word vectors of words in the current sentence 1 and a hidden layer state at a previous moment. The hidden layer state at the previous moment is an output at the previous moment. If a current moment is the moment t, the previous moment is a moment t−1. Further, $h_t$ that is outputted at the moment t can be calculated according to word vectors of a sentence that is inputted at the moment t and $h_{t-1}$ that is outputted at the moment t−1. If the word-level LSTM is sequential LSTM, the hidden layer state representation of each word is calculated from the first word to the last word in the sentence 1. If the word-level LSTM is reverse LSTM, the hidden layer state representation of each word is calculated from the last word to the first word in the sentence 1.

For the sentence-level LSTM layer, an input is a mean vector of splicing vectors of word-level bidirectional LSTM hidden layers at all moments. Each hidden layer state of the sentence-level LSTM layer represents the vector of each sentence in the document. A vector representation d of the entire document represents a mean vector of splicing vectors of all sentence-level bidirectional LSTM hidden layers, as shown in formula (7):

$$d = \frac{1}{N_d} \sum_{j=1}^{N_d} [h_j^f, h_j^b] \quad (7)$$

$h_j^f$ and $h_j^b$ respectively represent a forward hidden layer state and a backward hidden layer state of the sentence-level LSTM layer of a $j^{th}$ sentence, $N_d$ represents a number of sentences in the document, and "[ ]" represents vector splicing.

For some documents with titles, such as news, the title can concisely show document content and is useful for summary extraction. In the LSTM model, the title may be considered as a sentence, so that a vector representation t of the title is a mean vector of splicing vectors of word-level bidirectional LSTM hidden layers of all words in the title, as shown in formula (8):

$$t = \frac{1}{N_t} \sum_{j=1}^{N_t} [h_j'^f, h_j'^b] \quad (8)$$

$h_j'^f$ and $h_j'^b$ respectively represent a forward hidden layer state and a backward hidden layer state of the word-level LSTM of a $j^{th}$ word in the title, and $N_t$ represents a number of words in the title. When the vector of the title is calculated, parameters of word-level LSTM are reused.

104. Minimize a cost function by using the vector expression of the document to determine the parameters in the LSTM model to obtain the classifier for summary extraction.

For sentence classification, for each sentence, whether the current sentence is a summary sentence is determined through a classification layer. An output of the classification layer is a probability that the current sentence is a summary sentence, as shown in the following formula (9):

$$P(y_j=1|h_j,d) = w_c\sigma(W_ch_j)$$

represents richness of sentence content;

$$+w_s \sigma(h_j^T W_s d)$$

represents sentence significance and a similarity between a sentence and a document;

$$+w_{td} \sigma(t^T W_{td} d)$$

represents title significance and a similarity between a title and a document;

$$+w_{st} \sigma(h_j^T W_{st} t)$$

represents sentence significance and a similarity between a sentence and a title;

$$+w_{ap} \sigma(W_{ap} P_j^a)$$

represents absolute location importance;

$$+w_{rp} \sigma(P_j^r)$$

represents relative location importance; and $$+b$$

represents a bias term.

Where $y_j$ is 1 or 0 and represents whether the $j^{th}$ sentence of the document is a summary sentence, $h_j$ represents a splicing vector of a sentence-level bidirectional LSTM hidden layer at the moment j, $w_c$, $w_s$, $w_{td}$, $w_{st}$, $w_{ap}$, $w_{rp}$ represent weights of features, $w_c$, $w_s$, $w_{td}$, $w_{st}$, $w_{ap}$ are parameter representations of the features, $P_j^a$ represents an absolute location vector of the sentence, $P_h^r$ represents a relative location of the sentence, and $\sigma$ is a sigmoid function. That is, the probability that the current sentence is a summary sentence is obtained by weighting the features.

In the formula (9), $W_c h_j$ represents content information of the $j^{th}$ sentence in the document, richer sentence content indicates a higher possibility that the sentence is selected as a summary sentence; $h_j^T W_s d$ represents a similarity between a sentence and a document, and a higher similarity indicates that the current sentence can more represent the document and there is a higher possibility that the sentence is selected as a summary sentence; $t^T W_{td}$ represents a similarity between a title and a document, and $h_j^T W_{st} t$ represents a similarity between a sentence and a title. Generally, the content of the document can be well summarized in the title, so that a sentence with a higher similarity with the title is more likely to be used as a summary sentence. However, to prevent a case in which a title is inconsistent with document content, a higher similarity between the title and the document indicates a higher possibility that the sentence is selected as a summary sentence.

In the training process, each parameter W and b are solved under the condition of minimizing the cost function, and the cost function is a cross entropy of labeled classification results and predicted classification results, as shown in the following formula (10):

$$\text{cost}(W,b) = -\Sigma_{d=1}^{N} \Sigma_{j=1}^{Nd} (y_j^d \log P(y_j^d=1|h_j^d, d_d) + (1-y_j^d) \log(1 - P(y_j^d=1|h_j^d, d_d))) \quad (10)$$

Where $y_j^d$ represents whether a sentence is a summary sentence. In a prediction process, the model predicts a probability P) that each sentence sequence is a summary sentence, and a probability value between 0 and 1 can be used for extracting a summary.

If the probabilities of the sentences are determined, parameters $w_c$, $w_s$, $w_{td}$, $w_{st}$, $w_{ap}$ of the features can be determined.

The foregoing embodiment describes the training process of the classifier for summary extraction, and after the classifier is trained, the classifier can be used for extracting a summary from a target document.

Figure 5:
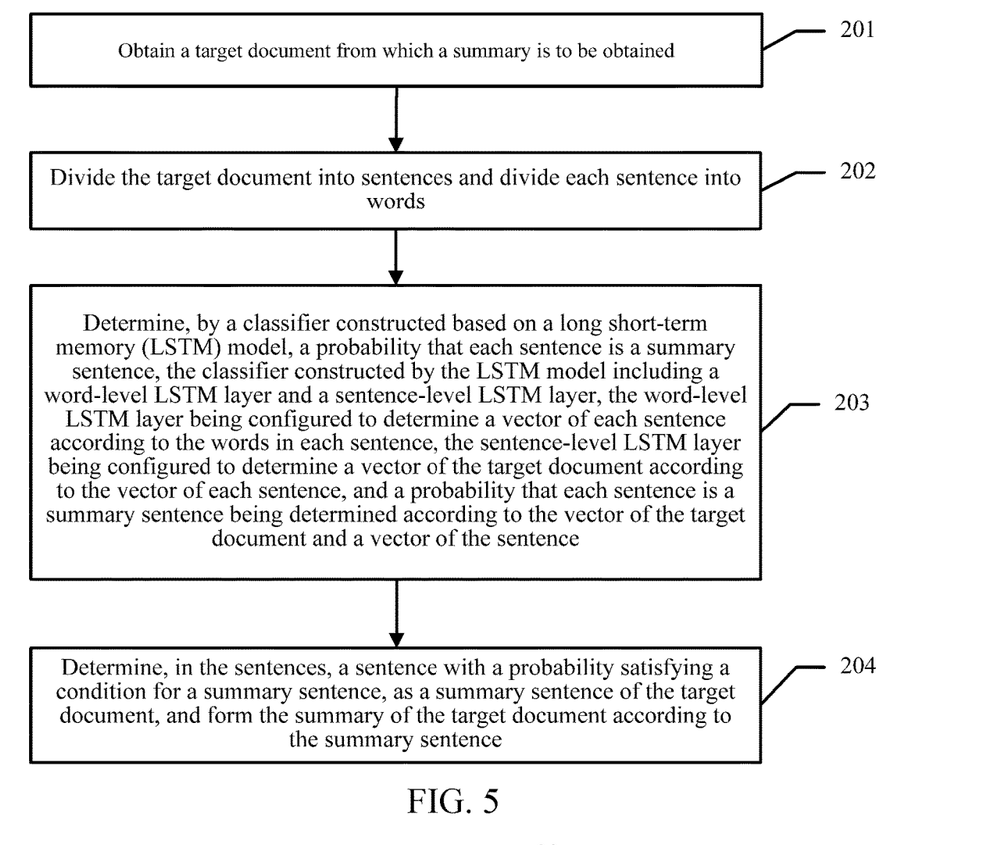
FIG. 5 is a schematic diagram of a summary obtaining method according to embodiments of the present disclosure.

To understand the process of extracting the summary of the target document by using the classifier, refer to FIG. 5. As shown in FIG. 5, an embodiment of a summary obtaining method provided in the embodiments of the present disclosure includes the followings.

201. Obtain a target document from which a summary or abstract is to be obtained.

In the embodiments of the present disclosure, the target document is a document from which a summary is to be extracted.

202. Divide the target document into sentences and divide each sentence into words.

A process of dividing the target document may include: dividing the target document into sentences according to boundary separators between sentences in the target document; dividing each sentence into word sets; and removing words that do not participate in semantic analysis in the word sets, to obtain each sentence used for determining a probability and obtain a word that participates in semantic analysis in each sentence.

The words that do not participate in semantic analysis refer to words that have no specific meaning, such as Chinese "了" and "的".

203. Determine, by a classifier constructed based on an LSTM model, a probability that each sentence is a summary sentence, the classifier constructed by the LSTM model including a word-level LSTM layer and a sentence-level LSTM layer, the word-level LSTM layer being configured to determine a vector of each sentence according to the words in each sentence, the sentence-level LSTM layer being configured to determine a vector of the target document according to the vector of each sentence, and a probability that any one of the sentences is a summary sentence being determined according to the vector of the target document and a vector of the sentence.

The vector of the target document may be a mean vector of the vectors of the sentences, or may be calculated by methods such as weighting according to the vector of each sentence.

For each sentence in the target document, the vector of each sentence may be determined by the word-level LSTM layer, and then the vector of the target document is determined by the sentence-level LSTM layer, and the vector of the target document is the mean vector of the vectors of the sentences. After the vector of the target document and the vector of each sentence are determined, the probability that each sentence is a summary sentence can be determined.

204. Determine, in the sentences, a sentence with a probability satisfying a condition for a summary sentence, as a summary sentence of the target document, and form the summary of the target document according to the summary sentence.

Complexity of the finally generated summary depends on different requirements of users. After the summary sentences are extracted from the original text, the summary sentences may be slightly polished and modified to obtain the final summary.

Optionally, the vector of the target document the vector of the target document is a mean vector of splicing vectors of the sentences, and the splicing vectors include forward vectors and backward vectors of the sentences; and each sentence includes a title of the target document, a vector of the title is a mean vector of splicing vectors of words in the title, and the splicing vectors of the words in the title include forward vectors and backward vectors of the words in the title.

Optionally, the process to determine, by a classifier constructed based on an LSTM model, a probability that each sentence is a summary sentence may include: determining a first similarity according to the vector of the target document and the vector of each sentence, where the first similarity is a similarity between each sentence and the target document; determining a second similarity according to the vector of the target document and the vector of the title, where the second similarity is a similarity between the title and the target document; determining a third similarity according to the vector of the title and the vector of each sentence, where the third similarity is a similarity between each sentence and the title; and determining, according to the first similarity, the second similarity, and the third similarity, the probability that each sentence is a summary sentence.

Optionally, the method may further include: determining richness of sentence content of each sentence and determining a location of each sentence in the target document. The process of determining, according to the first similarity, the second similarity, and the third similarity, the probability that each sentence is a summary sentence may include: determining, according to the richness of sentence content of each sentence, the location of each sentence in the target document, the first similarity, the second similarity, and the third similarity, the probability that each sentence is a summary sentence.

In the embodiments of the present disclosure, to understand a process of determining the probability of each sentence, refer to the formula (9). Certainly, in addition to the formula (9), any modification of the formula (9) with some features added or reduced can also be used for determining the probability of each sentence.

After the probability of each sentence is determined, whether a sentence is a summary sentence can be determined. If the probability of the sentence is 1, the sentence may be determined as a summary sentence. If the probability of the sentence is 0, the sentence may be determined not to be a summary sentence. A probability threshold may be set. If the probability threshold is 0.8, if the probability of the sentence is greater than 0.8, the sentence is determined as a summary sentence, or if the probability of the sentence is less than 0.8, the sentence is determined not to be a summary sentence. Certainly, the probability threshold may be set according to requirements, which is not limited to the specific value of the example.

In the embodiments of the present disclosure, the classifier is constructed by the LSTM model. For each sentence in the document, the probability that the sentence is a summary sentence is predicted. In addition, the title can concisely show document content and is very useful for automatic summary extraction. Therefore, in the embodiments of the present disclosure, title information is incorporated into the classifier for summary extraction, similarity information between the title and the document is considered as well as the similarity between the title and each sentence, to improve quality of the summary. The sentence and the document can be fully modeled from the semantic perspective by using the word vector obtained from pre-training of a large-scale corpus and context information. The method and the apparatus can reduce incompleteness caused by features of artificial design, and can well use semantic information and title information of the text, to improve accuracy of the extracted summary.

The foregoing describes the training process of the classifier for summary extraction and the process of extracting the summary of the target document by using the classifier, and the following describes a summary obtaining apparatus 30 and a training apparatus 40 for a classifier for summary extraction in the embodiments of the present disclosure with reference to the accompanying drawings.

Figure 6:
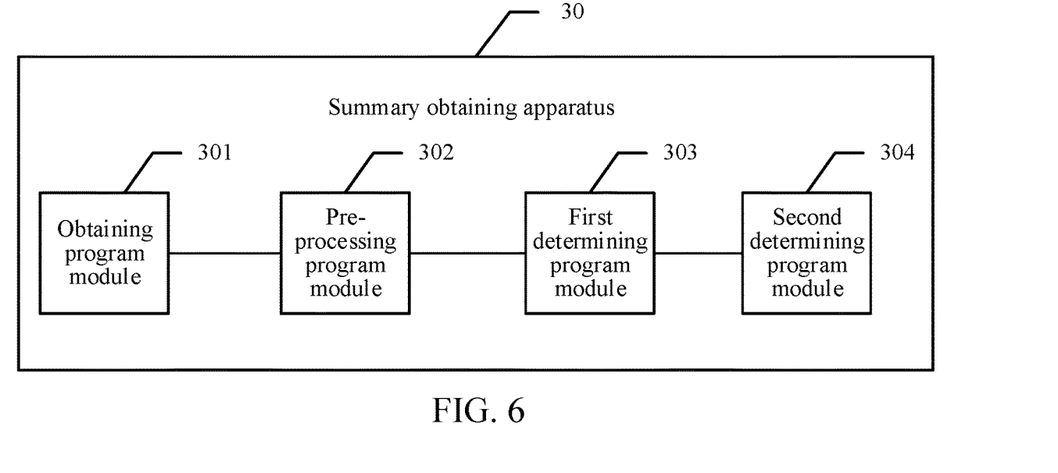
FIG. 6 is a schematic diagram of a summary obtaining apparatus according to embodiments of the present disclosure.

Referring to FIG. 6, an embodiment of the summary obtaining apparatus 30 provided in the embodiments of the present disclosure includes: an obtaining program module 301, a pre-processing program module 302, a first determining program module 303, and a second determining program module 304, etc.

The obtaining program module 301 is configured to obtain a target document from which a summary is to be obtained. The pre-processing program module 302 is configured to divide the target document obtained by the obtaining program module 301 into sentences and divide each sentence into words.

The first determining program module 303 is configured to determine, by a classifier constructed based on an LSTM model, a probability that each sentence obtained by the pre-processing program module 302 is a summary sentence, the classifier constructed by the LSTM model including a word-level LSTM layer and a sentence-level LSTM layer, the word-level LSTM layer being configured to determine a vector of each sentence according to the words in each sentence, the sentence-level LSTM layer being configured to determine a vector of the target document according to the vector of each sentence, and a probability that any one of the sentences is a summary sentence being determined according to the vector of the target document and a vector of the sentence.

The second determining program module 304 is configured to determine, in the sentences determined by the first determining program module 303, a sentence with a probability satisfying a condition for a summary sentence, as a summary sentence of the target document, and forming the summary of the target document according to the summary sentence.

The summary obtaining apparatus 30 provided in the embodiments of the present disclosure uses the classifier constructed based on the LSTM model to determine the probability that each sentence is a summary sentence. In the LSTM model, the word-level LSTM layer is used for determining the vector of each sentence, the sentence-level LSTM layer is used for determining the vector of the target document, the vector of the target document and the vector of each sentence are used for determining the probability that each sentence is a summary sentences. Such a summary obtaining manner can improve accuracy of summary obtaining, to improve quality of the summary of the target document that is automatically extracted.

Optionally, the vector of the target document is a mean vector of splicing vectors of the sentences, and the splicing vectors include forward vectors and backward vectors of the sentences; and each sentence includes a title of the target document, a vector of the title is a mean vector of splicing vectors of words in the title, and the splicing vectors of the words in the title include forward vectors and backward vectors of the words in the title.

Optionally, the first determining program module 303 is configured to: determine a first similarity according to the vector of the target document and the vector of each sentence, where the first similarity is a similarity between each sentence and the target document; determine a second similarity according to the vector of the target document and the vector of the title, where the second similarity is a similarity between the title and the target document; determine a third similarity according to the vector of the title and the vector of each sentence, where the third similarity is a similarity between each sentence and the title; and determine, according to the first similarity, the second similarity, and the third similarity, the probability that each sentence is a summary sentence.

In the embodiments of the present disclosure, when the summary sentence is predicted, the similarity between the title and the document, the similarity between each sentence and the document, and the similarity between each sentence and the title are considered, to further improve quality of the extracted summary.

Figure 7:
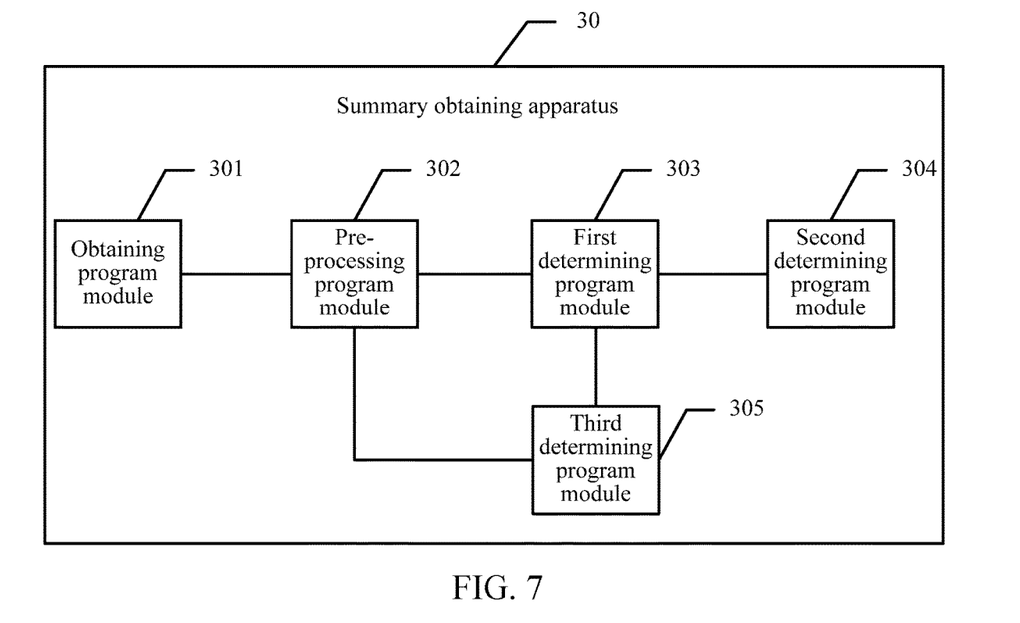
FIG. 7 is a schematic diagram of another summary obtaining apparatus according to embodiments of the present disclosure.

Optionally, referring to FIG. 7, another summary-obtaining apparatus 30 provided in the embodiments of the present disclosure, the apparatus 30 further includes a third determining program module 305.

The third determining program module 305 is configured to determine richness of sentence content of each sentence and determine a location of each sentence in the target document; and the first determining program module 303 is configured to determine, according to the richness of sentence content of each sentence, the location of each sentence in the target document, the first similarity, the second similarity, and the third similarity, the probability that each sentence is a summary sentence.

Figure 8:
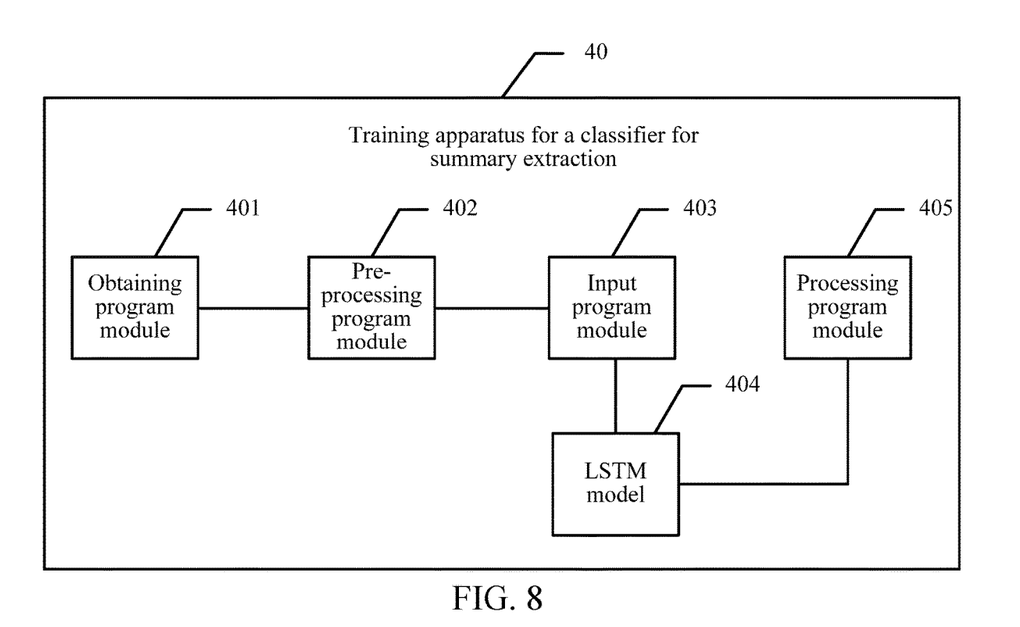
FIG. 8 is a schematic diagram of a training apparatus for a classifier for summary extraction according to embodiments of the present disclosure.

Referring to FIG. 8, an embodiment of the training apparatus 40 for a classifier for summary extraction provided in the embodiments of the present disclosure includes: an obtaining program module 401, a pre-processing program module 402, an input program module 403, an LSTM model 404, and a processing program module 405, etc.

The obtaining program module 401 is configured to obtain a document used for training the classifier; and the pre-processing program module 402 is configured to divide the document obtained by the obtaining program module 401 into sentences and divide each sentence into words.

The input program module 403 is configured to input each sentence obtained by the pre-processing program module to the LSTM model 404, to obtain a vector expression of the document, the LSTM model including a word-level LSTM layer and a sentence-level LSTM layer, the word-level LSTM layer being configured to determine a vector of each sentence according to the words in each sentence, the sentence-level LSTM layer being configured to determine a vector of the target document according to the vector of each sentence, the vector of the target document being a mean vector of the vectors of the sentences, and the vector expression of the document including parameters in the LSTM model.

The processing program module 405 is configured to minimize a cost function by using the vector expression of the document obtained by the LSTM model 404 to determine the parameters in the LSTM model to obtain the classifier for summary extraction.

Optionally, the pre-processing program module 402 is configured to: divide the document into sentences according to boundary separators between sentences in the document; divide each sentence into word sets; and remove words that do not participate in semantic analysis in the word sets, to obtain each sentence used for training the classifier and obtain a word that participates in semantic analysis in each sentence.

Figure 9:
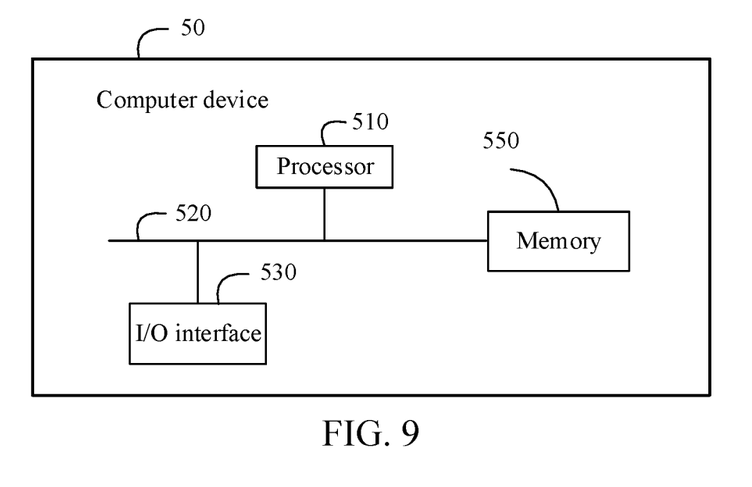
FIG. 9 is a schematic diagram of a computer device according to embodiments of the present disclosure.

FIG. 9 is a schematic structural diagram of a computer device 50 according to an embodiment of the prevent invention. The computer device 50 includes a processor 510, a memory 550, and an I/O interface 530. The memory 550 may include a read-only memory (ROM) and a random-access memory (RAM), and provide operation instructions and data to the processor 510. A part of the memory 550 may further include a nonvolatile RAM (NVRAM).

In some implementations, the memory 550 stores the following elements: executable modules or data structures, subsets thereof, or supersets thereof.

In this embodiment of the prevent invention, in a process of summary obtaining, the operation instructions stored in the memory 550 (the operation instructions may be stored in an operating system) are invoked to: obtain, by using the I/O interface 530, a target document from which a summary is to be obtained; divide the target document into sentences and divide each sentence into words; determine, by a classifier constructed based on an LSTM model, a probability that each sentence is a summary sentence, the classifier constructed by the LSTM model including a word-level LSTM layer and a sentence-level LSTM layer, the word-level LSTM layer being configured to determine a vector of each sentence according to the words in each sentence, the sentence-level LSTM layer being configured to determine a vector of the target document according to the vector of each sentence, and a probability that any one of the sentences is a summary sentence being determined according to the vector of the target document and a vector of the sentence; and determine, in the sentences, a sentence with a probability satisfying a condition for a summary sentence, as a summary sentence of the target document, and form the summary of the target document according to the summary sentence.

In the embodiments of the present disclosure, the classifier constructed based on the LSTM model is used for determining the probability that each sentence is a summary sentence. In the LSTM model, the word-level LSTM layer is used for determining the vector of each sentence, the sentence-level LSTM layer is used for determining the vector of the target document, the vector of the target document and the vector of each sentence are used for determining the probability that each sentence is a summary sentences. Such a summary obtaining manner can improve accuracy of summary obtaining, to improve quality of the summary of the target document that is automatically extracted.

The processor 510 controls operations of the computer device 50, and may also be referred to as a central processing unit (CPU). The memory 550 may include a ROM and a RAM, and provide operation instructions and data to the processor 510. A part of the memory 550 may further include an NVRAM. In specific application, components of the computer device 50 are coupled together through a bus system 520, where the bus system 520 may further include a power bus, a control bus, and a state signal bus, in addition to a data bus. For clarity, the various buses are labeled as the bus system 520 in the diagram.

The method disclosed by the foregoing embodiment of the prevent invention may be applied to the processor 510, or be implemented by the processor 510. The processor 510 may be an integrated circuit chip having a capability of signal processing. In the implementation process, the steps of the above method may be implemented by an integrated logic circuit of hardware or instructions in the form of software in the processor 510. The processor 510 may be a general-purpose processor, a digital signal processor (DSP), an application-specific integrated circuit (ASIC), a field programmable gate array (FPGA), or another programmable logic device, discrete gate or transistor logic device, or a discrete hardware component. Various methods, steps, and logic block diagrams disclosed in the embodiments of the prevent invention may be implemented or performed. The general-purpose processor may be a microprocessor or may be any regular processor. The steps of the method disclosed in the embodiments of the prevent invention may be implemented directly by a hardware decoding processor, or by a combination of hardware and software modules in a decoding processor. The software modules may be located in a RAM, a flash memory, a ROM, a programmable ROM or an electrically-erasable programmable memory, a register and other mature storage media in the field. The storage medium is located in the memory 550, and the processor 510 reads the information in the memory 550 and implements the steps of the above method in combination with the hardware of the processor 510.

Optionally, the vector of the target document is a mean vector of splicing vectors of the sentences, and the splicing vectors include forward vectors and backward vectors of the sentences; and each sentence includes a title of the target document, a vector of the title is a mean vector of splicing vectors of words in the title, and the splicing vectors of the words in the title include forward vectors and backward vectors of the words in the title.

Optionally, the processor 510 is configured to: determine a first similarity according to the vector of the target document and the vector of each sentence, where the first similarity is a similarity between each sentence and the target document; determine a second similarity according to the vector of the target document and the vector of the title, where the second similarity is a similarity between the title and the target document; determine a third similarity according to the vector of the title and the vector of each sentence, where the third similarity is a similarity between each sentence and the title; and determine, according to the first similarity, the second similarity, and the third similarity, the probability that each sentence is a summary sentence.

Optionally, the processor 510 is further configured to: determine richness of sentence content of each sentence and determine a location of each sentence in the target document, and then determine, according to the richness of sentence content of each sentence, the location of each sentence in the target document, the first similarity, the second similarity, and the third similarity, the probability that each sentence is a summary sentence.

Optionally, the processor 510 is configured to: divide the target document into sentences according to boundary separators between sentences in the target document; divide each sentence into word sets; and remove words that do not participate in semantic analysis in the word sets, to obtain each sentence used for determining a probability and obtain a word that participates in semantic analysis in each sentence.

In a training process of the classifier for summary extraction, devices in the computer device 50 perform the followings.

The I/O interface 530 is configured to obtain a document used for training the classifier.

The processor 510 is configured to: divide the document into sentences and divide each sentence into words; input each sentence to an LSTM model, to obtain a vector expression of the document, the LSTM model including a word-level LSTM layer and a sentence-level LSTM layer, the word-level LSTM layer being configured to determine a vector of each sentence according to the words in each sentence, the sentence-level LSTM layer being configured to determine a vector of the document according to the vector of each sentence, and the vector expression of the document including parameters in the LSTM model; and minimize a cost function by using the vector expression of the document to determine the parameters in the LSTM model to obtain the classifier for summary extraction.

Optionally, the processor 510 is configured to: divide the document into sentences according to boundary separators between sentences in the document; divide each sentence into word sets; and remove words that do not participate in semantic analysis in the word sets, to obtain each sentence used for training the classifier and obtain a word that participates in semantic analysis in each sentence.

To understand the above description of the computer device 50, refer to the descriptions of FIG. 1 to FIG. 5, which is not described herein again.

Figure 10:
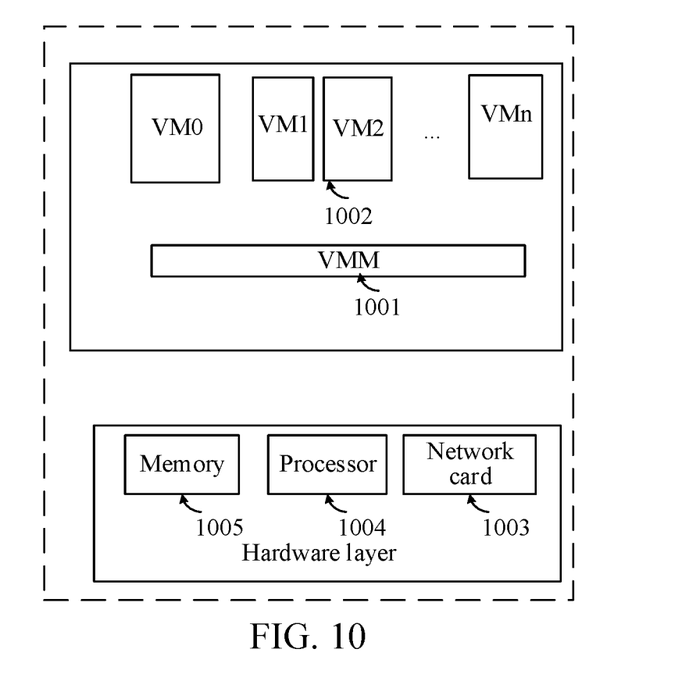
FIG. 10 is a schematic diagram of virtualization of a computer device according to embodiments of the present disclosure.

The above computer device may also be a virtualized system, and a representation form of the computer device in a virtualized scenario is shown in FIG. 10. The computer device in the virtualized scenario includes a hardware layer, a virtual machine monitor (VMM) 1001 running on the hardware layer, and a plurality of virtual machines 1002. One or more virtual machines may be selected as master nodes, and a plurality of virtual machines may be selected as work nodes.

Specifically, the virtual machines 1002 are one or more virtual computers simulated on common hardware resources by virtual machine software. The virtual machines work like real computers, operating systems and applications can be installed in the virtual machines, and the virtual machines can access network resources. Applications run in the virtual machines work as if in real computers.

The hardware layer is a hardware platform run in a virtualized environment that can be abstracted from hardware resources of one or more physical hosts. The hardware layer may include various devices, such as a processor 1004 (such as a CPU) a memory 1005, and further include a network card 1003 (such as RDMA network card), a high speed/low speed I/O device, and other devices with specific processing functions.

In addition, the distributed system in the virtualized scenario may further include a host. As a management layer, the host is configured to manage and allocate hardware resources, present a virtual hardware platform for virtual machines, and implement scheduling and isolation of virtual machines. The host may be a VMM; in addition, sometimes the VMM and a privileged virtual machine work together to form the host. The virtual hardware platform provides various hardware resources for various virtual machines running on the virtual hardware platform, for example, provides a virtual processor (such as a VCPU), a virtual memory, a virtual disk, a virtual network card, and the like. The virtual disk may correspond to a file or a logical block device of the Host. The virtual machines run in the virtual hardware platform provided by the host, and one or more virtual machines run in the host.

The privileged virtual machine is a special virtual machine, also referred to as a driver domain, for example, the special virtual machine is referred to as Dom0 on a Xen Hypervisor platform. Drivers for real physical devices such as a network card and an SCSI disk are installed in the special virtual machine, and the real physical devices can be detected and directly accessed. Other virtual machines access the real physical devices through the privileged virtual machine by using the corresponding mechanism provided by the Hypervisor.

The above embodiment may be implemented in whole or in part by software, hardware, firmware, or any combination thereof. When implemented by software, the above embodiment may be implemented in whole or in part in the form of a computer program product.

The computer program product includes one or more computer instructions. When the computer program instructions are loaded and executed on a computer, all or part of the processes or functions described according to the embodiments of the present disclosure are generated. The computer may be a general-purpose computer, a special-purpose computer, a computer network, or another programmable device. The computer instructions may be stored in a computer-readable storage medium, or may be transmitted from a computer-readable storage medium to another computer-readable storage medium, for example, the computer instructions may be transmitted from a website, computer, server or data center to another website, computer, server or data center by means of wired transmission (such as coaxial cable, fiber optic cable, digital subscriber line (DSL)) or wireless transmission (such as infrared, wireless, microwave). The computer-readable storage medium may be any available medium that the computer can store or a data storage device including one or more available media integration such as a server and a data center. The available medium may be a magnetic medium (such as floppy disk, hard disk, magnetic tape), an optical medium (such as DVD), or a semiconductor medium (such as solid-state disk (SSD)).

In addition, the embodiments of the present disclosure further provide a storage medium, the storage medium is configured to store program code, and the program code is configured to implement the method provided in the above embodiment.

The various embodiments in this specification are described in a progressive manner. Each embodiment focuses on differences from other embodiments. For the same or similar parts between the various embodiments, refer to each other. The devices disclosed in the embodiments correspond to the methods disclosed in the embodiments, so that the descriptions of the devices are relatively simple. For relevant information of the devices, refer to the descriptions of the methods.

A person skilled in the art can understand that the elements and algorithm steps of the various examples described in combination with the embodiments disclosed herein may be implemented in electronic hardware, computer software, or a combination of both. To clearly illustrate the interchangeability of hardware and software, the composition and steps of the examples are generally described in terms of functions. Whether these functions are implemented in hardware or software depends on specific application and design constraints of technical solutions. A skilled person can implement the described functions in different ways for each particular application, but such implementation shall not be considered beyond the scope of the present invention.

The steps of methods or algorithms described in combination with the embodiments disclosed herein may be implemented directly in hardware, a software module executed by a processor, or a combination of both. The software module may be placed in a RAM, a memory, a ROM, an electrically programmable ROM, an electrically erasable programmable ROM, a register, a hard disk, a removable disk, a CD-ROM, or any other form of storage medium known in the technical field.

A person skilled in the art can implement or use the present invention following the above description of the disclosed embodiments. For people skilled in the art, a variety of modifications to these embodiments are apparent. The general principles defined herein may be implemented in other embodiments without departing from the spirit or scope of the present invention. Therefore, the present invention is not limited to the embodiments shown herein but shall conform to the broadest scope consistent with the principles and novel features disclosed herein.

What is claimed is:

1. A summary obtaining method applied to a computer device, comprising:
   obtaining a target document from which a summary is to be obtained;
   dividing the target document into sentences and dividing each sentence into words;
   obtaining a classifier constructed based on a long short-term memory (LSTM) model, wherein the classifier comprises a word-level LSTM layer and a sentence-level LSTM layer, the word-level LSTM layer is configured to determine a vector of each sentence according to the words in each sentence, the sentence-level LSTM layer is configured to determine a vector of the target document according to the vector of each sentence, wherein the vector of the target document is a mean vector of splicing vectors of the sentences, and the splicing vectors comprise forward vectors and backward vectors of the sentences;
   determining, by using the classifier, a probability that each sentence is a summary sentence, including:
      determining a first similarity between each sentence and the target document according to the vector of the target document and the vector of each sentence;
      determining a second similarity between a title of the target document and the target document according to the vector of the target document and a vector of the title, wherein a vector of the title is a mean vector of splicing vectors of words in the title, and the splicing vectors of the words in the title comprise forward vectors and backward vectors of the words in the title;
      determining a third similarity between each sentence and the title according to the vector of the title and the vector of each sentence; and
      determining, according to the first similarity, the second similarity, and the third similarity, the probability that each sentence is a summary sentence; and
   determining, in the sentences, a sentence with the probability satisfying a predetermined condition for a summary sentence, as a summary sentence of the target document, and forming the summary of the target document according to the summary sentence of the target document.

2. The method according to claim 1, wherein
   the sentences of the target document comprise the title of the target document, and the vector of the title is obtained by reusing parameters of the word-level LSTM layer and the sentence-level LSTM layer.

3. The method according to claim 1, wherein:
   the method further comprises:
   determining richness of sentence content of each sentence and determining a location of each sentence in the target document; and
   the determining, according to the first similarity, the second similarity, and the third similarity, the probability that each sentence is a summary sentence further comprises:
   determining, according to the richness of sentence content of each sentence, the location of each sentence in the target document, the first similarity, the second similarity, and the third similarity, the probability that each sentence is a summary sentence.

4. The method according to claim 1, wherein the dividing the target document into sentences and dividing each sentence into words comprises:
dividing the target document into sentences according to boundary separators between sentences in the target document;
dividing each sentence into word sets; and
removing words that do not participate in semantic analysis in the word sets, to obtain each sentence used for determining the probability and words participating in the semantic analysis in each sentence.

5. The method according to claim 1, wherein the classifier is trained by:
obtaining a document used for training the classifier;
dividing the document into sentences and dividing each sentence into words;
inputting each sentence to the long short-term memory (LSTM) model, to obtain a vector expression of the document, the vector expression of the document comprising parameters in the LSTM model; and
minimizing a cost function by using the vector expression of the document to determine the parameters in the LSTM model to obtain the classifier for summary extraction.

6. The method according to claim 5, wherein the dividing the document into sentences and dividing each sentence into words comprises:
dividing the document into sentences according to boundary separators between sentences in the document;
dividing each sentence into word sets; and
removing words that do not participate in semantic analysis in the word sets, to obtain each sentence used for training the classifier and words participating in the semantic analysis in each sentence.

7. The method according to claim 1, wherein:
the vector of the title is calculated by a bidirectional LSTM trained separately from the sentence-level LSTM layer.

8. The method according to claim 1, wherein:
the vector of the title is obtained by reusing parameters of the sentence-level LSTM layer.

9. A computer device for obtaining summaries of documents, comprising:
an input/output (I/O) interface;
a memory storing computer program instructions; and
a processor coupled to I/O interface and to the memory and, when executing the computer program instructions, configured to perform:
obtaining a target document from which a summary is to be obtained via the I/O interface;
dividing the target document into sentences and dividing each sentence into words;
obtaining a classifier constructed based on a long short-term memory (LSTM) model, wherein the classifier comprises a word-level LSTM layer and a sentence-level LSTM layer, the word-level LSTM layer is configured to determine a vector of each sentence according to the words in each sentence, the sentence-level LSTM layer is configured to determine a vector of the target document according to the vector of each sentence, wherein the vector of the target document is a mean vector of splicing vectors of the sentences, and the splicing vectors comprise forward vectors and backward vectors of the sentences;
determining, by using the classifier, a probability that each sentence is a summary sentence, including:
determining a first similarity between each sentence and the target document according to the vector of the target document and the vector of each sentence;
determining a second similarity between a title of the target document and the target document according to the vector of the target document and a vector of the title, wherein a vector of the title is a mean vector of splicing vectors of words in the title, and the splicing vectors of the words in the title comprise forward vectors and backward vectors of the words in the title;
determining a third similarity between each sentence and the title according to the vector of the title and the vector of each sentence; and
determining, according to the first similarity, the second similarity, and the third similarity, the probability that each sentence is a summary sentence; and
determining, in the sentences, a sentence with the probability satisfying a predetermined condition for a summary sentence, as a summary sentence of the target document, and forming the summary of the target document according to the summary sentence of the target document.

10. The computer device according to claim 9, wherein the sentences of the target document comprise the title of the target document and the vector of the title is obtained by reusing parameters of the word-level LSTM layer and the sentence-level LSTM layer.

11. The computer device according to claim 9, wherein:
the processor is further configured to perform:
determining richness of sentence content of each sentence and determining a location of each sentence in the target document; and
the determining, according to the first similarity, the second similarity, and the third similarity, the probability that each sentence is a summary sentence further comprises:
determining, according to the richness of sentence content of each sentence, the location of each sentence in the target document, the first similarity, the second similarity, and the third similarity, the probability that each sentence is a summary sentence.

12. The computer device according to claim 9, wherein the dividing the target document into sentences and dividing each sentence into words comprises:
dividing the target document into sentences according to boundary separators between sentences in the target document;
dividing each sentence into word sets; and
removing words that do not participate in semantic analysis in the word sets, to obtain each sentence used for determining the probability and words participating in the semantic analysis in each sentence.

13. The computer device according to claim 9, wherein the classifier is trained by:
obtaining a document used for training the classifier;
dividing the document into sentences and dividing each sentence into words;
inputting each sentence to the long short-term memory (LSTM) model, to obtain a vector expression of the document, the vector expression of the document comprising parameters in the LSTM model; and minimizing a cost function by using the vector expression of the document to determine the parameters in the LSTM model to obtain the classifier for summary extraction.

14. The computer device according to claim 13, wherein the dividing the document into sentences and dividing each sentence into words comprises:
   dividing the document into sentences according to boundary separators between sentences in the document;
   dividing each sentence into word sets; and
   removing words that do not participate in semantic analysis in the word sets, to obtain each sentence used for training the classifier and words participating in the semantic analysis in each sentence.

15. A non-transitory computer-readable storage medium storing computer program instructions executable by at least one processor to perform:
   obtaining a target document from which a summary is to be obtained;
   dividing the target document into sentences and dividing each sentence into words;
   obtaining a classifier constructed based on a long short-term memory (LSTM) model, wherein the classifier comprises a word-level LSTM layer and a sentence-level LSTM layer, the word-level LSTM layer is configured to determine a vector of each sentence according to the words in each sentence, the sentence-level LSTM layer is configured to determine a vector of the target document according to the vector of each sentence, wherein the vector of the target document is a mean vector of splicing vectors of the sentences, and the splicing vectors comprise forward vectors and backward vectors of the sentences;
   determining, by using the classifier, a probability that each sentence is a summary sentence, including:
      determining a first similarity between each sentence and the target document according to the vector of the target document and the vector of each sentence;
      determining a second similarity between a title of the target document and the target document according to the vector of the target document and a vector of the title, wherein a vector of the title is a mean vector of splicing vectors of words in the title, and the splicing vectors of the words in the title comprise forward vectors and backward vectors of the words in the title;
      determining a third similarity between each sentence and the title according to the vector of the title and the vector of each sentence; and
      determining, according to the first similarity, the second similarity, and the third similarity, the probability that each sentence is a summary sentence; and
   determining, in the sentences, a sentence with the probability satisfying a predetermined condition for a summary sentence, as a summary sentence of the target document, and forming the summary of the target document according to the summary sentence of the target document.

16. The non-transitory computer-readable storage medium according to claim 15, wherein the sentences of the target document comprise the title of the target document and the vector of the title is obtained by reusing parameters of the word-level LSTM layer and the sentence-level LSTM layer.

17. The non-transitory computer-readable storage medium according to claim 15, wherein:
   the computer program instructions are executable by the at least one processor to further perform:
   determining richness of sentence content of each sentence and determining a location of each sentence in the target document; and
   the determining, according to the first similarity, the second similarity, and the third similarity, the probability that each sentence is a summary sentence further comprises:
   determining, according to the richness of sentence content of each sentence, the location of each sentence in the target document, the first similarity, the second similarity, and the third similarity, the probability that each sentence is a summary sentence.

18. The non-transitory computer-readable storage medium according to claim 15, wherein the dividing the target document into sentences and dividing each sentence into words comprises:
   dividing the target document into sentences according to boundary separators between sentences in the target document;
   dividing each sentence into word sets; and
   removing words that do not participate in semantic analysis in the word sets, to obtain each sentence used for determining the probability and words participating in the semantic analysis in each sentence.

19. The non-transitory computer-readable storage medium according to claim 15, wherein the classifier is trained by:
   obtaining a document used for training the classifier;
   dividing the document into sentences and dividing each sentence into words;
   inputting each sentence to the long short-term memory (LSTM) model, to obtain a vector expression of the document, the vector expression of the document comprising parameters in the LSTM model; and
   minimizing a cost function by using the vector expression of the document to determine the parameters in the LSTM model to obtain the classifier for summary extraction.

20. The non-transitory computer-readable storage medium according to claim 19, wherein the dividing the document into sentences and dividing each sentence into words comprises:
   dividing the document into sentences according to boundary separators between sentences in the document;
   dividing each sentence into word sets; and
   removing words that do not participate in semantic analysis in the word sets, to obtain each sentence used for training the classifier and words participating in the semantic analysis in each sentence.

* * * * *